United States Patent [19]
Nagata

[11] Patent Number: 5,974,224
[45] Date of Patent: Oct. 26, 1999

[54] METHOD AND APPARATUS FOR DECODING VIDEO SIGNALS

[75] Inventor: Atsushi Nagata, Hirakatashi, Japan

[73] Assignee: Matsushita Electric Industrial Co., Ltd., Japan

[21] Appl. No.: 08/881,125

[22] Filed: Jun. 24, 1997

[30] Foreign Application Priority Data

Jun. 24, 1996 [JP] Japan .................................... 8-162546

[51] Int. Cl.$^6$ .............................. A04N 5/917; A04N 7/26
[52] U.S. Cl. ........................................... 386/109; 386/111
[58] Field of Search .................................... 386/109, 111, 386/112, 124, 113, 46, 27, 33, 40, 1; 360/32; H04N 5/917, 7/26

[56] References Cited

U.S. PATENT DOCUMENTS

| | | | |
|---|---|---|---|
| 4,931,879 | 6/1990 | Koga et al. | 386/109 |
| 5,377,051 | 12/1994 | Lane et al. | 360/33.1 |
| 5,493,456 | 2/1996 | Augenbraun et al. | 360/64 |

Primary Examiner—Robert Chevalier
Attorney, Agent, or Firm—Parkhurst & Wendel, L.L.P.

[57] ABSTRACT

A method for decoding video signals comprising decoding a bit stream, and reproducing a video signal in reverse order of frames, the bit stream including each frame of the video signal which has been encoded using one of an intra coding system (I picture), a predictive coding system (P picture), and a bidirectionally predictive coding system (B picture), includes a group of frames including at least one frame of I picture, which can be decoded from the I picture and consecutively reproduced in order of the frames, being called a GOP (Group of Pictures); the frames being output in reverse order of the frames to obtain a desired frame, wherein: when the desired frame is one of I picture and P picture, only the I picture and P pictures from the first I picture in a GOP to the desired frame are decoded; and when the desired frame is B picture, only the desired frame is decoded if reference frames required for decoding of the desired frame are present in frame memories. As described above, in the method for decoding video signals according to the present invention, decoding processing of a desired frame is performed each time to output a reproduced image. Consequently, an increase in circuit scale can be avoided, resulting in smooth backward reproduction with a small memory capacity.

6 Claims, 11 Drawing Sheets

|  | start address | word number |  |
|---|---|---|---|
| 501 | 0 | 12034 | 502 |
| 503 | 12034 | 14155 | 504 |
| 505 | 410899 | 10985 | 506 |

| | temporal reference | packet number | |
|---|---|---|---|
| 511 | 0 | 0 | 512 |
| 513 | 0 | 1 | 514 |
| 515 | 0 | 3 | 516 |
| 517 | 1 | 12 | 518 |
| 519 | 1 | 14 | 520 |

Fig.11 Prior Art contents of frame memory

GOP(n+1)

| 0 | 1 | 2 | 3 | 4 | 5 | 6 | 7 | 8 | 9 | 10 | 11 | 12 |
|---|---|---|---|---|---|---|---|---|---|----|----|----|
| 19I | 20B | 21B | 22P | 23B | 24B | 25P | 26B | 27B | 28P | 29B | 30B | 31P |

GOP(n)

| 0 | 1 | 2 | 3 | 4 | 5 | 6 | 7 | 8 | 9 | 10 | 11 | 12 |
|---|---|---|---|---|---|---|---|---|---|----|----|----|
| 4I | 5B | 6B | 7P | 8B | 9B | 10P | 11B | 12B | 13P | 14B | 15B | 16P |

METHOD AND APPARATUS FOR DECODING VIDEO SIGNALS

FIELD OF THE INVENTION

The present invention relates to a method and an apparatus for reading compressed and encoded video signals from a storage medium that records the compressed and encoded video signals, and decoding and reproducing the encoded video signals that have been read. More particularly, the invention relates to a method and an apparatus for decoding video signals utilizing a backward reproducing function.

BACKGROUND OF THE INVENTION

In recent years, development of techniques for compressing and encoding video signals, and larger capacities of storage media, such as magnetic disks or optical disks, have made it practicable to compress and encode video signals or sound signals and record the compressed and encoded signals in a storage medium.

Figure 8:
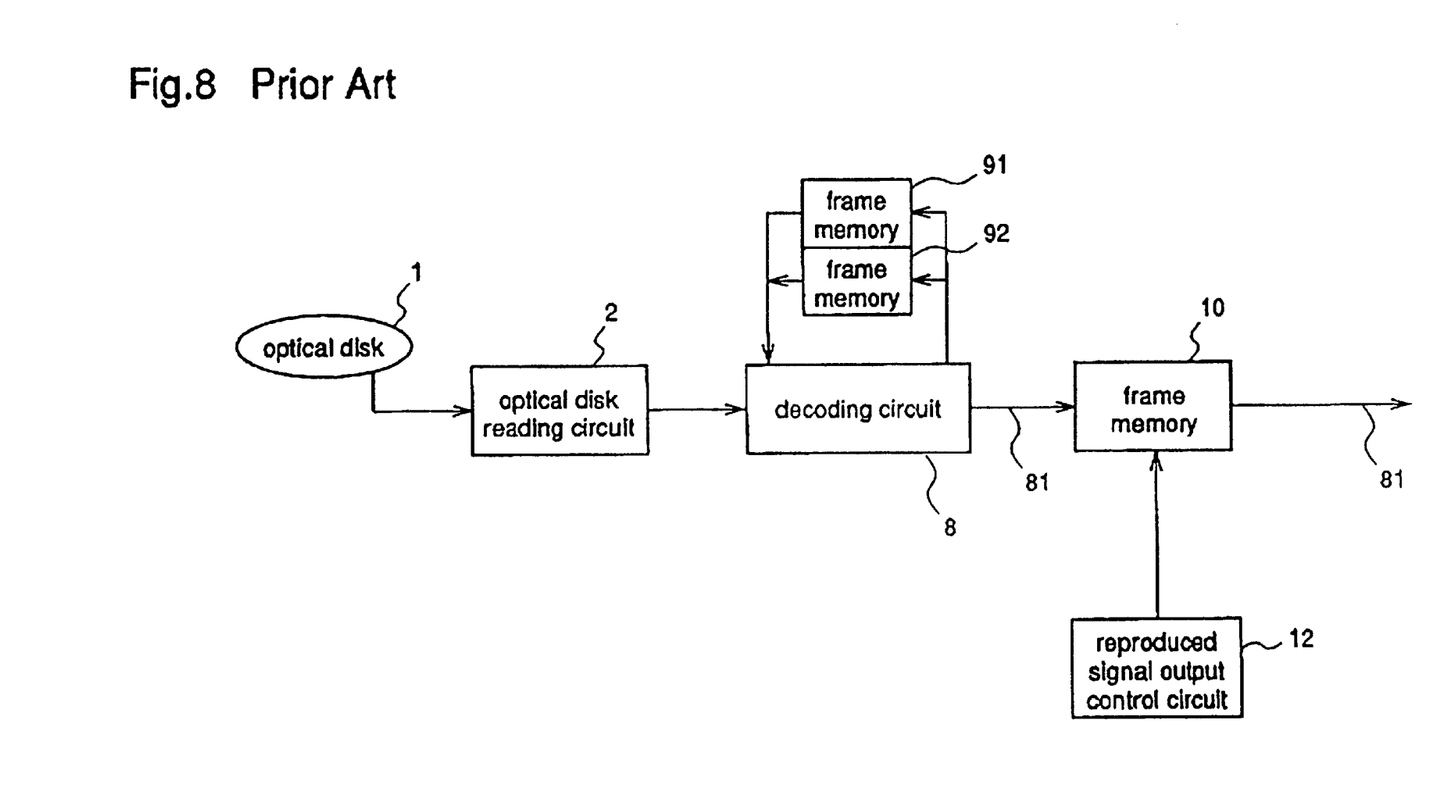
FIG. 8 is a block diagram illustrating a prior art apparatus for decoding video signals.

FIG. 8 is a block diagram illustrating a prior art apparatus for decoding video signals. In the figure, reference numeral 1 designates an optical disk for recording bit streams that are obtained by compressing and encoding video signals and sound signals. When the bit streams are recorded in the optical disk 1, in order to prevent errors, interleaving is performed for the bit streams and error-correcting codes are added thereto. Reference numeral 2 designates an optical disk reading circuit for performing de-interleaving for a signal that is read from the optical disk 1 and correcting an error of the read signal, and outputting a bit stream 21. Reference numeral 8 designates a decoding circuit of video signals for decoding the bit stream 21 output from the optical disk reading circuit 2 to output a reproduced signal 81. Reference numerals 91 and 92 designate frame memories for storing the reproduced signal 81 that is produced in the decoding circuit 8. The reproduced signal 81 stored in the frame memories 91 and 92 is used as a reference image in the decoding circuit 8. Reference numeral 10 designates a frame memory for inputting and temporarily storing the reproduced signal 81 output from the decoding circuit 8, and reading out the reproduced signal 81 temporarily stored, according to a control signal from a reproduced signal output control circuit, thereby obtaining an output signal of this decoding apparatus. Reference numeral 12 designates a reproduced signal output control circuit for outputting a control signal required for readout of the reproduced signal 81 that is stored in the frame memory 10, to the frame memory 10.

The optical disk 1 in the apparatus for decoding video signals constituted as described above records video signals which are compressed and encoded according to the MPEG video standard of the ISO (hereinafter referred to as MPEG system). This MPEG system is a system of compressing and encoding video signals with high efficiency, based on inter-frame predictive coding. In this system, by changing prediction methods of respective plural frames, it is possible to realize high compression efficiency and reproduction in the middle of a sequence.

Figure 9:
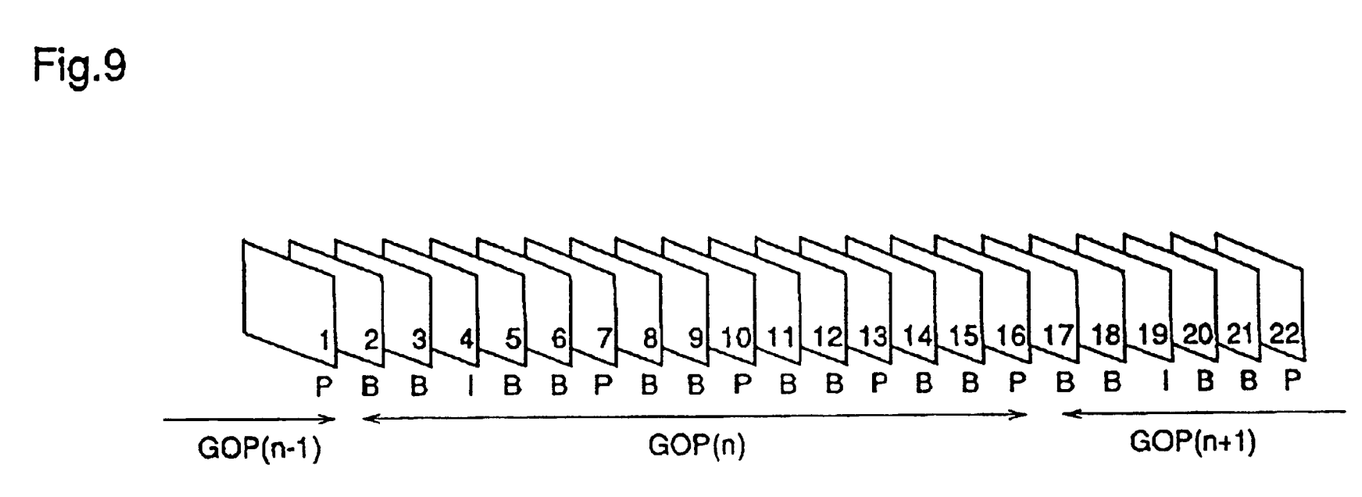
FIG. 9 is a diagram for explaining GOPs in MPEG system.

FIG. 9 is a diagram illustrating a plurality of consecutive image frames in time series. A prediction method in the MPEG system will be described. In the figure, numerals in the frames represent consecutive numbers of the frames, respectively, and it shows that time passes as the number increases. For example, the frame No.11 is a frame after the frame No.10.

In addition, alphabetical characters I, P, and B under the frames represent prediction methods of the frames, respectively. The frame with I, which is called I picture, is an intra coded picture that is encoded with only information in the frame. The frame with P, which is called P picture, is a predictive coded picture that is encoded by using the I picture or the P picture of three frames before as a reference image. For example, the P picture of the frame No.13 is predicted and encoded from one way using the P picture of the frame No.10 as a reference image. The frame with B, which is called B picture that is the characteristic of the MPEG system, is a bidirectionally predictive coded picture that is encoded by using the frames before and after the B picture as a reference image. For example, the B picture of the frame No.12 is predicted and encoded from both way using the P pictures of the frames No.10 and No.13 as a reference image.

In the MPEG system, a group of a plurality of frames including one frame as I picture is called GOP (group of pictures). For example, in FIG. 9, a GOP unit comprises fifteen frames from the B picture of the frame No.2 to the P picture of the frame No.16, and corresponds to GOP(n), i.e., a range shown by a line with arrows at both ends. In addition, consecutive numbers n−1, n, n+1 of GOP are given for explanation. In the MPEG system, because the frames as P picture and B picture are predicted and encoded, based on data of the frames in one way and in two way, respectively, no perfect information is obtained from only data of the P picture or the B picture. Therefore, for example, random access to a GOP unit with data of a plurality of frames makes it possible to decode and reproduce a desired image from halfway through a serial video image. In this case, since the GOP unit includes one frame as I picture that is encoded with only information in the frame, decoding and reproduction are started from the I picture.

Figure 10:
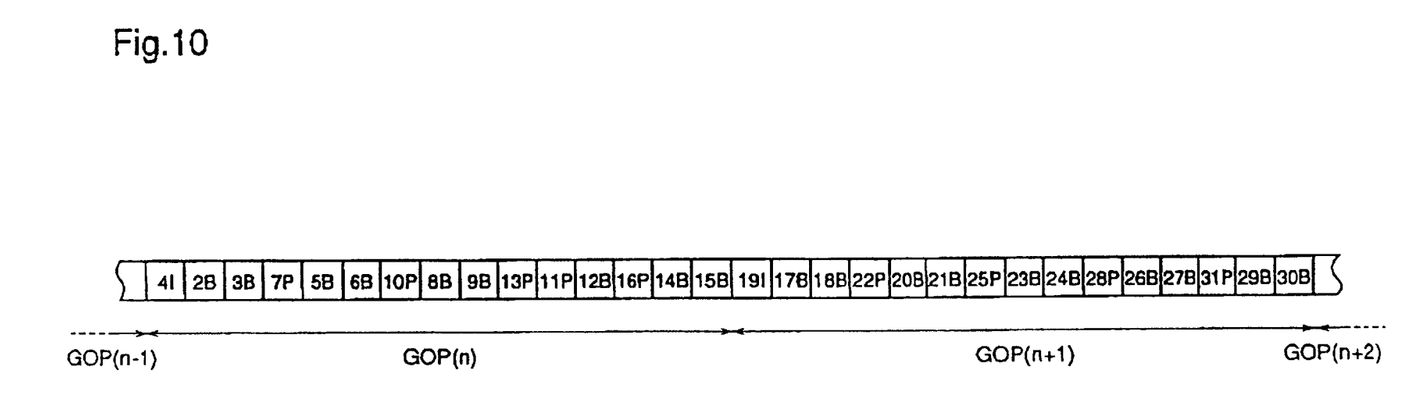
FIG. 10 is a diagram illustrating a bit stream that is obtained by encoding the GOPs in MPEG system.

FIG. 10 shows a bit stream that is obtained by encoding the respective frames shown in FIG. 9. Since the order of the frames shown in FIG. 10 becomes one convenient for encoding processing and decoding processing, it is different from the order of the consecutive frames in time series shown in FIG. 9. For example, 4I represents the I picture of the frame No.4, 2B represents the B picture of the frame No.2, and 7P represents the P picture of the frame No.7. This notation will be used hereinafter when a specified frame and its picture type are described.

A description is given of operations of such an apparatus for decoding video signals as described above.

First, the operation in forward reproduction is described. The optical disk reading circuit 2 reads a bit stream from the optical disk 1 in order of the consecutive numbers of GOP. In the case of the bit stream shown in FIG. 10, that is in order of GOP(n−1), GOP(n), GOP(n+1), and GOP(n+2). The bit stream thus read is input to the decoding circuit 8. The decoding circuit 8 decodes the input bit stream sequentially to output the reproduced signal 81 according to the consecutive numbers of the frames. The frame memory 10 serves as a mere buffer, and temporarily stores the reproduced signal 81 and reads out the same, thereby producing an output 81 of this apparatus for decoding video signals.

Next, the operation in backward reproduction is described. The optical disk reading circuit 2 reads a bit stream from the optical disk 1 in reverse order of the consecutive numbers of GOP. In the case of the bit stream shown in FIG. 10, that is in order of GOP(n+2), GOP(n+1), GOP(n), and GOP(n−1). The bit stream thus read from the optical disk 1 is decoded in a forward direction by the decoding circuit 8 to obtain a reproduced image. The obtained reproduced image is stored in the frame memory 10. Then, the frame memory 10 reads out the reproduced image in a backward direction, thereby obtaining an output signal 81 of this apparatus, resulting in backward reproduction.

Figure 11:
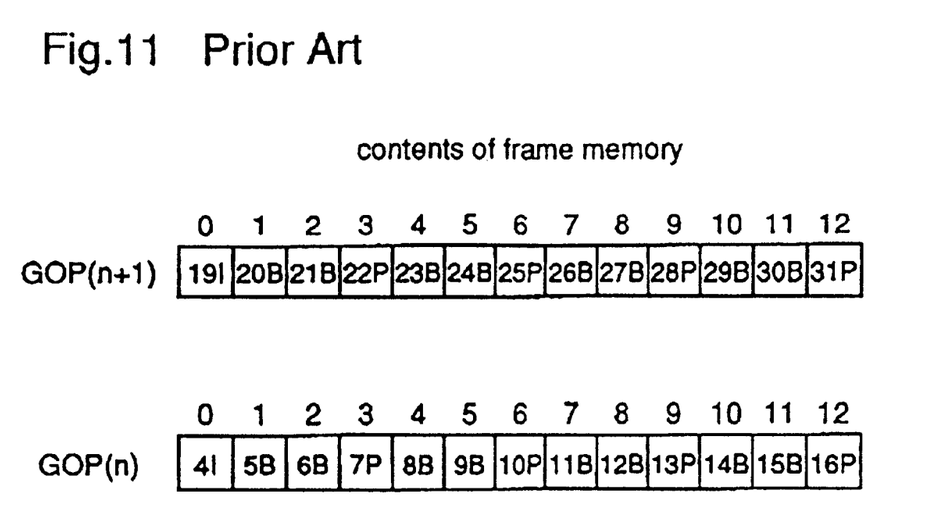
FIG. 11 is a diagram for explaining contents of a frame memory in the prior art apparatus for decoding video signals.

FIG. 11 is a diagram for explaining the operation of the frame memory 10 in backward reproduction. In the figure, GOP(n+1) shows the state in which a reproduced image obtained by decoding a bit stream of GOP(n+1) with the decoding circuit 8 is stored in the frame memory 10. Numerals 0 to 12 represent region numbers of the frame memory 10. This reproduced image, which is stored in the frame memory 10 with a storage region corresponding to thirteen frames, is read out, for each frame, from the region number 12 toward the region number 0, thereby obtaining an output signal 81 in which the reproduced image is in reverse of the forward order, like 31P, 30B, 29B, . . . . After outputting the reproduced image of the frames of GOP(n+1), a reproduced image obtained by decoding a bit stream of GOP(n) with the decoding circuit 8 is stored in the frame memory 10. In FIG. 11, GOP(n) shows this state. Then, the same operation as in the case of GOP(n+1) is performed, thereby producing an output signal 81 in which the reproduced image of GOP(n) is in reverse order. Hereafter, the operations described above are repeated to realize backward reproduction.

The prior art apparatus for decoding video signals constituted as described above requires a frame memory of a large capacity that can store a reproduced image of one GOP when backward reproduction of video signals is performed, leading to an increase in circuit scale and cost up.

Further, in the prior art decoding apparatus, when backward reproduction of video signals is performed, after the reproduced image of GOP(n+1) is output as an output signal from the frame memory, GOP(n) is decoded and the reproduced image of GOP(n) is stored in the frame memory 10 to produce an output signal. Therefore, there is a space of time between the output of the reproduced image of GOP(n+1) and the output of the reproduced image of GOP(n), whereby a space of reproduction time is produced between the frames which belong to the boundary between GOP(n+1) and GOP(n), for example, the frame 17B as the last output of GOP(n+1) and the frame 16P as the first output of GOP(n). As a result, it is difficult to obtain a smooth reproduced image.

Furthermore, when backward reproduction of video signals is performed in the prior art decoding apparatus, in the case of decoding B pictures which will make a reproduced image after I picture, for example, the frames 17B and 18B of GOP(n+1), the P picture, i.e., the frame 16P, of GOP(n) before GOP(n+1) including the reproduced image is used as a reference image. Therefore, another frame memory for storing a reproduced image of GOP(n) obtained by decoding GOP(n) is required, resulting in an increase in circuit scale of frame memories. In addition, when decoding of the frames 17B and 18B is omitted in order to avoid the increase in circuit scale, no perfectly consecutive frames are obtained, so that the quality of the image is adversely affected.

SUMMARY OF THE INVENTION

It is an object of the present invention to provide a method and an apparatus for decoding video signals in which an increase in circuit scale is avoided and a smooth backward reproduced image is produced with a small memory capacity.

Other objects and advantages of the present invention will become apparent from the detailed description given hereinafter; it should be understood, however, that the detailed description and specific embodiment are given by way of illustration only, since various changes and modifications within the scope of the invention will become apparent to those skilled in the art from this detailed description.

According to a first aspect of the present invention, a method for decoding video signals comprising decoding a bit stream, and reproducing a video signal in reverse order of frames, the bit stream including each frame of the video signal which has been encoded using one of an intra coding system (I picture), a predictive coding system (P picture), and a bidirectionally predictive coding system (B picture), includes a group of frames including at least one frame of I picture, which can be decoded from the I picture and consecutively reproduced in order of the frames, being called a GOP (Group of Pictures); the frames being output in reverse order of the frames to obtain a desired frame, wherein: when the desired frame is one of I picture and P picture, only the I picture and P pictures from the first I picture in a GOP to the desired frame are decoded; and when the desired frame is B picture, only the desired frame is decoded if reference frames required for decoding of The desired frame are present in frame memories. As described above, in the method for decoding video signals according to the present invention, decoding processing of a desired frame is performed each time to output a reproduced image. Consequently, an increase in circuit scale can be avoided, resulting in smooth backward reproduction with a small memory capacity.

According to a second aspect of the present invention, in the decoding method of the first aspect of the invention, when the desired frame is present in a frame memory, the desired frame is output. As described above, in the method for decoding video signals according to the present invention, decoding processing of a desired frame is performed each time to output a reproduced image. Consequently, an increase in circuit scale can be avoided, resulting in smooth backward reproduction with a small memory capacity.

According to a third aspect of the present invention, the decoding method of any of the first and second aspects of the invention includes providing at least three frame memories; and while outputting a reproduced signal from the first frame memory, decoding a next desired frame that is output using the second and third frame memories. As described above, in the method for decoding video signals according to the present invention, decoding processing of a desired frame is performed each time to output a reproduced image. Consequently, an increase in circuit scale can be avoided, resulting in smooth backward reproduction with a small memory capacity.

According to a fourth aspect of the present invention, an apparatus for decoding video signals comprises a storage medium for recording a bit stream that is obtained by encoding respective frames in a GOP using intra coding of one frame, and predictive coding and bidirectionally predictive coding of a given number of frames, the GOP (Group of Pictures) including a group of frames that can be decoded from halfway through a bit stream obtained by compressing and encoding a video signal; a storage medium reading means for reading a bit stream of an arbitrary GOP from the storage medium; a bit stream storage means for temporarily storing the bit stream, and reading and outputting the bit stream by one of consecutively outputting and partially outputting, according to an instruction of a reading control means; a picture type determining means for evaluating the bit stream output from the bit stream storage means, and determining picture types serving as prediction systems for encoding the respective frames; a decoding means for decoding only given picture types of the bit stream output from the bit stream storage means, by one of consecutively decoding and decoding according to the results of the picture type determining means; frame memories for storing at least three reproduced image frames that are output from the decoding means, and using these frames as a reference image and decoded outputs in the decoding means; a retrieval table creating means for outputting position information of bit streams of the frames by bidirectionally predictive coding that are stored in the bit stream storage means, to a retrieval table, based on the results by the picture type determining means; a retrieval table created by the retrieval table creating means; and a reading control means for outputting an address for outputting a bit stream of a given frame from the bit stream storage means, referring to the retrieval table. As described above, in the apparatus for decoding video signals according to the present invention, decoding processing of a desired frame is performed each time to output a reproduced image. Consequently, an increase in circuit scale can be avoided, resulting in smooth backward reproduction with a small memory capacity.

According to a fifth aspect of the present invention, an apparatus for decoding video signals comprises a storage medium for recording a bit stream that is obtained by encoding respective frames in a GOP using intra coding of one frame, and predictive coding and bidirectionally predictive coding of a given number of frames, and signals except a video signal, which have been multiplexed as a packet, the GOP (Group of Pictures) including a group of frames that can be decoded from halfway through a bit stream obtained by compressing and encoding a video signal; a storage medium reading means for reading an arbitrary packet from the storage medium; a packet storage means for temporarily storing the packet output from the storage medium reading means, and outputting the bit stream by one of consecutively outputting and partially outputting, according to an instruction of a reading control means; a demultiplexing means for extracting the bit stream of the video signal from outputs of the packet storage means; a picture type determining means for determining picture types serving as prediction systems for encoding the respective frames, In the bit stream of the video signal; a decoding means for decoding only given picture types of the bit stream of the video signal, by one of consecutively decoding and decoding according to the results of the picture type determining means; frame memories for storing at least three reproduced image frames that are output from the decoding means, and using these frames as a reference image and decoded outputs in the decoding means; a retrieval table creating means for outputting position information of bit streams of the frames by bidirectionally predictive coding that are stored in the packet storage means, to a retrieval table, based on the results by the picture type determining means; a retrieval table created by the retrieval table creating means; and a reading control means for outputting an address for outputting a packet including a bit stream of a given frame from the packet storage means, referring to the retrieval table. As described above, in the apparatus for decoding video signals according to the present invention, decoding processing of a desired frame is performed each time to output a reproduced image Consequently, an increase in circuit scale can be avoided, resulting in smooth backward reproduction with a small memory capacity.

DETAILED DESCRIPTION OF THE PREFERRED EMBODIMENTS

[Embodiment 1]

Figure 1:
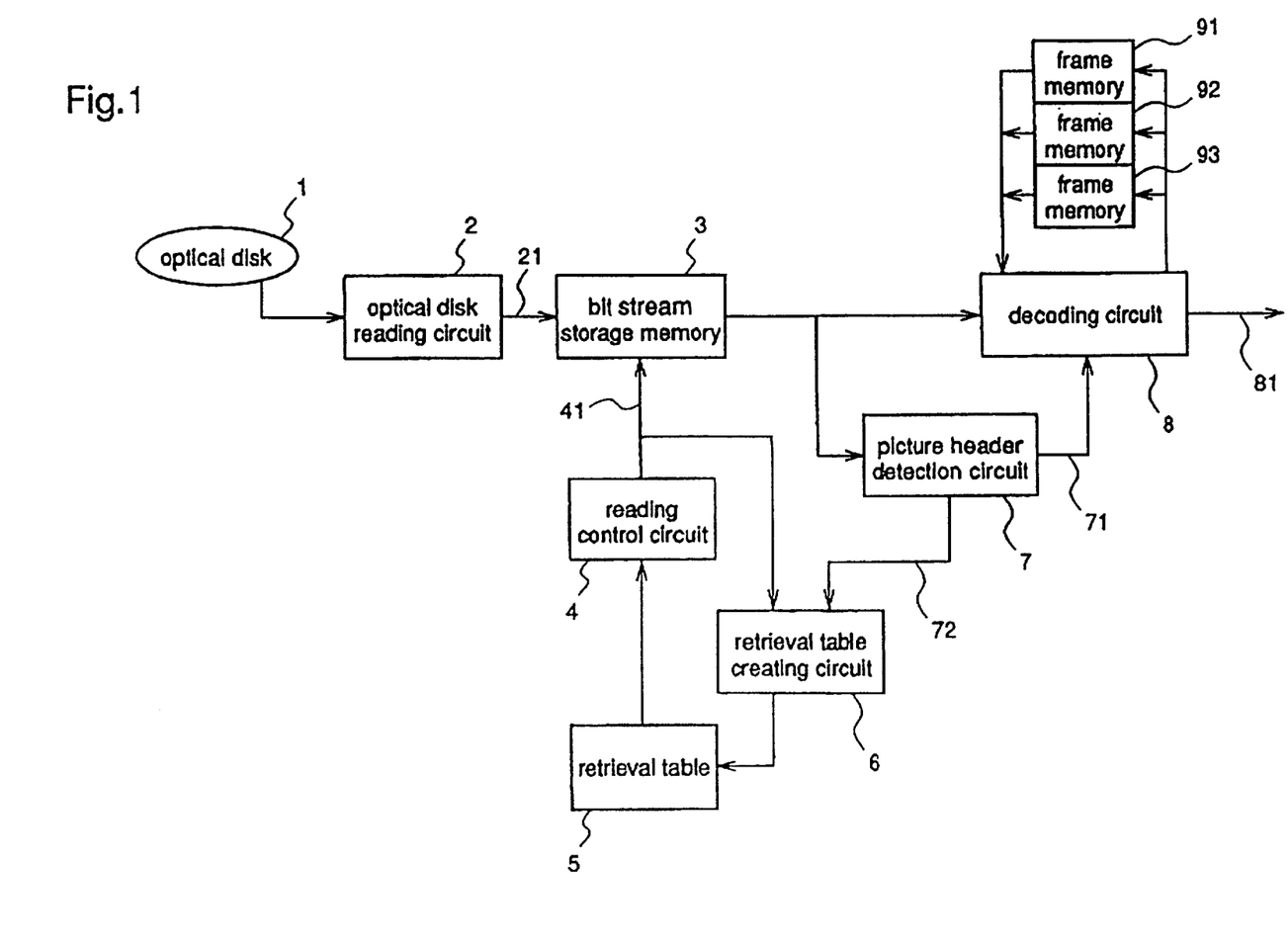
FIG. 1 is a block diagram illustrating an apparatus for decoding video signals according to a first embodiment of the present invention.

FIG. 1 is a block diagram illustrating an apparatus for decoding video signals according to a first embodiment of the present invention. In the figure, the optical disk 1 and the optical disk reading circuit 2 are the same as those of the prior art apparatus. Reference numeral 3 designates a bit stream storage memory for storing a bit stream 21 that is output from the optical disk reading circuit 2, and outputting the bit stream 21 according to an address signal 41 from a reading control circuit. Reference numeral 4 designates a reading control circuit for outputting the address signal 41 to the bit stream storage memory 3. Reference numeral 5 designates a retrieval table for storing addresses of the B pictures that are stored in the bit stream storage memory 3. Reference numeral 6 designates a retrieval table creating circuit for creating the retrieval table 5, based on the address signal 41 and a B picture detection signal 72. Reference numeral 7 designates a picture header detecting circuit for determining picture types of bit streams of the input frames, and outputting a decoding control signal 71 to a decoding circuit and outputting the B picture detection signal 72 to the retrieval table creating circuit 6. Reference numeral 8 designates a decoding circuit for decoding the input bit stream 21 to obtain a reproduced image, and outputting a reproduced signal 81. Reference numerals 91 to 93 designate frame memories for recording a reproduced image of I picture and P picture used as a reference image.

A description is given of operations of the apparatus for decoding video signals according to the first embodiment of the invention.

First, the operation in forward reproduction is described. The optical disk reading circuit 2 reads a signal from the optical disk 1 and outputs the bit stream 21 in order of the consecutive numbers of GOP. The bit stream 21 thus output is written to the bit stream storage memory 3. Then, the bit stream 21 is read in the order of writing to be input to the decoding circuit 8. The decoding circuit 8 decodes the input bit stream sequentially to output the reproduced signal 81.

Next, the operation in backward reproduction, for example, when reproduced from the frame 31P of GOP(n+1) in a backward direction, is described.

Figure 2:
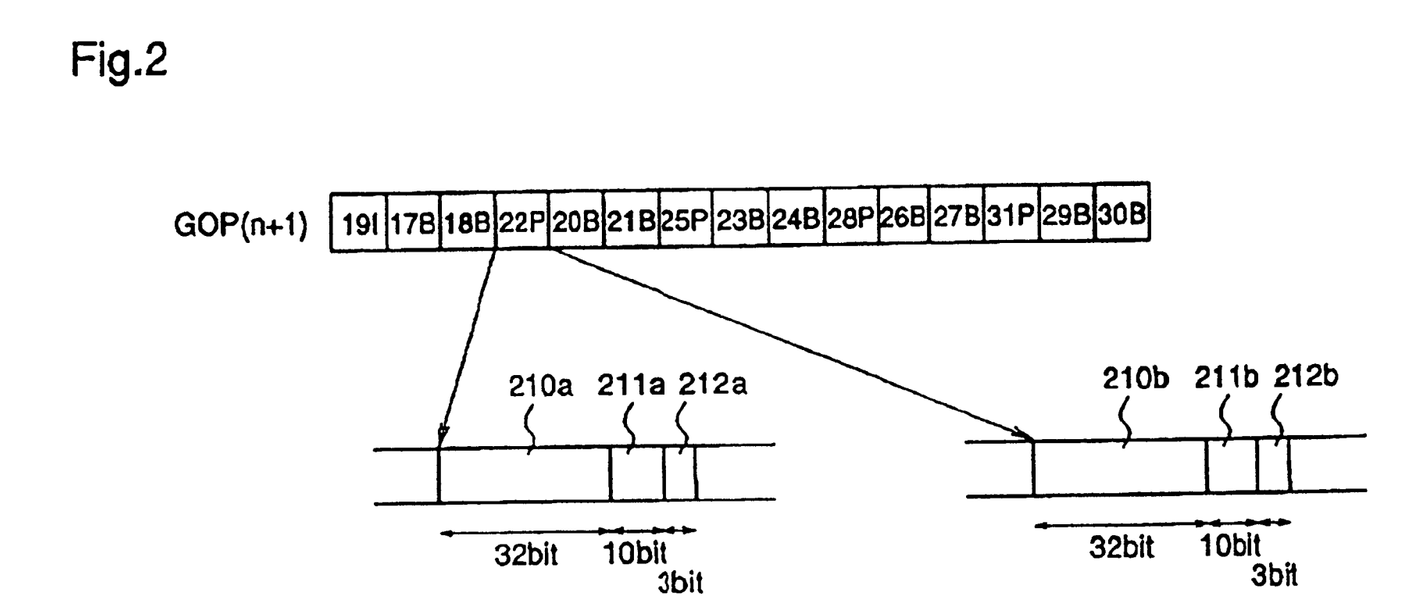
FIG. 2 is a diagram for explaining a syntax of a bit stream of GOP(n+1) according to the first embodiment of the invention.

The optical disk reading circuit 2 reads a bit stream of GOP(n+1) from the optical disk 1 that stores the same bit stream shown in FIG. 10 as in the prior art apparatus. FIG. 2 is a diagram illustrating a syntax of the bit stream of GOP(n+1) that is read from the optical disk 1. For example, the frame 22P comprises bit streams of 210a, 211a, and 212a, and the frame 20B after the frame 22P comprises bit streams of 210b, 211b, and 212b. Reference characters 210a and 210b denote picture start codes of 32 bits, which are only used at the heads of the pictures. Reference characters 211a and 211b denote temporal references for representing the display order of the picture in GOP by 10 bits. Reference characters 212a and 212b denote picture coding types for representing a picture type by 3 bits, and the picture coding type 212a shows P picture and the picture coding type 212b shows B picture.

Figure 3:
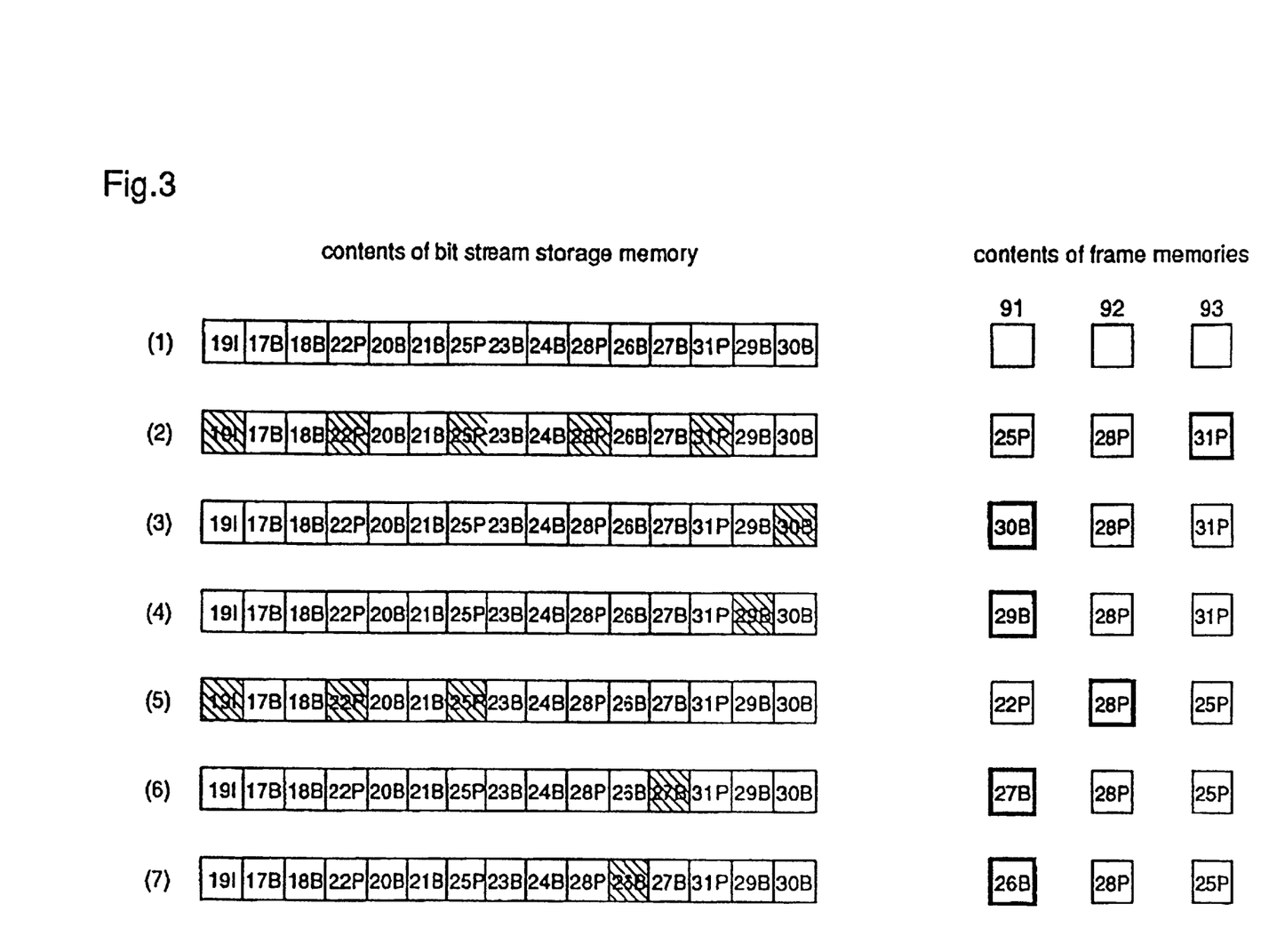
FIG. 3 is a diagram for explaining contents of a bit stream storage memory and frame memories in the apparatus for decoding video signals according to the first embodiment of the invention.

The bit stream of GOP(n+1) read from the optical disk 1 is stored in the bit stream storage memory 3. In FIG. 3, (1) shows the state in which the bit stream of GOP(n+1) including the frames from the frame 19I to the frame 30B is stored in the bit stream storage memory 3. Then, the bit stream of GOP(n+1) stored in the bit stream storage memory 3 is read and input to the picture header detecting circuit 7 and to the decoding circuit 8. The reading of the bit stream of GOP(n+1) is in the order of storage, i.e., in order of the frame 19I, the frame 17B, the frame 18B, . . . .

The picture header detecting circuit 7 detects picture headers of bit streams of the input pictures, and determines coding types of the pictures with the picture coding types. If the picture type is I picture or P picture, the decoding circuit 8 is instructed to perform decoding operation in accordance with the decoding control signal 71, and the decoding circuit 8 decodes the pictures in order of the frame 19I, the frame 22P, the frame 25P, the frame 28P, and the frame 31P. If the picture type is B picture, the decoding circuit 8 is instructed not to perform decoding operation in accordance with the decoding control signal 71, and the decoding circuit 8 does not decode the B pictures.

A reproduced image that is obtained by decoding the frame 19I, the frame 22P, and the frame 25P with the decoding circuit 8 is recorded in the frame memories 91 to 93. Subsequently, the frame 28P and the frame 31P are decoded to obtain a reproduced image. At this time, the reproduced image of the frames 19I, 22P, and 25P has been already recorded in the frame memories 91 to 93. As shown in FIG. 3 by (2), however, the reproduced image of the frames 28P and 31P overwrite the reproduced image of the frames 19I and 22P of older numbers to be recorded in the frame memories. In this way, the reproduced image of the frame 25P, the frame 28P, and the frame 31P serving as the latest reproduced image, which has been used for decoding processing, remains in the frame memories 91 to 93. When all the bit streams of GOP(n+1) are read from the bit stream storage memory 3 and decoding of the I picture and the P picture is completed with the decoding circuit 8 and the output signal 81 of the frame 31P is output from the decoding circuit 8, the operation of the decoding circuit 8 is stopped.

In addition, as shown in FIG. 3 by (2), the frame memory 93 is framed with bold face, which shows that the reproduced image of the frame 31P is output as the reproduced output 81 of the decoding circuit 8. The frame 19I, the frame 22P, the frame 25P, the frame 28P, and the frame 31P are hatched, which shows that the decoding circuit 8 decodes these frames.

Simultaneously with the decoding operation of the I picture and the P picture, the picture header detecting circuit 7 detects the B pictures of GOP(n+1) from the bit stream of GOP(n+1) which is stored in the bit stream storage memory 3, and outputs the B picture detection signal 72 to the retrieval table creating circuit 6. In the retrieval table creating circuit 6, storage addresses of the B pictures in the bit stream storage memory 3 are ascertained from the address signal 41 which is now being output and the B picture detection signal 72 which is output from the picture header detecting circuit 7, and information of the B picture addresses Is output to the retrieval table 5.

Figure 4:
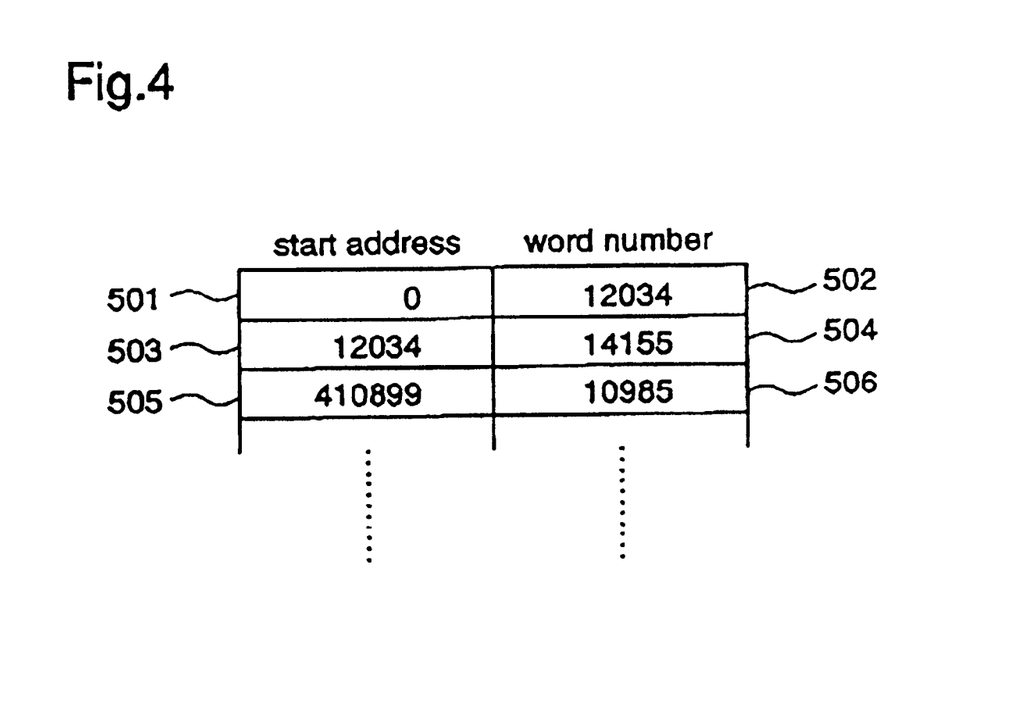
FIG. 4 is a diagram for explaining contents of a retrieval table in the apparatus for decoding video signals according to the first embodiment of the invention.

FIG. 4 shows contents of the retrieval table 5. In the figure, reference numeral 501 designates a start address of a bit stream of the first B picture of GOP in the bit stream storage memory 3, and numeral 502 designates the word number of the bit stream of the first B picture. For example, in the case of the bit stream of GOP(n+1) shown in FIG. 3, information of the frame 17B is stored in the start address 501 and the word number 502. Similarly, information of the second B picture is stored in a start address 503 and the word number 504, and information of the third B picture is stored in a start address 505 and the word number 506.

The above is the operation of the decoding apparatus according to the first embodiment, until the reproduced image of the frame 31P is obtained in backward reproduction.

In backward reproduction, the frame 30B becomes a reproduced image after the frame 31P. The operation of the decoding apparatus when the reproduced image of the frame 30B in backward reproduction is obtained will be described.

Since the frame 30B is B picture, the reproduced image of the frame 28P and the frame 31P as a reference image is required for decoding. This reproduced image is present in the frame memories 92 and 93. Therefore, the bit stream of the frame 30B is read from the bit stream storage memory 3 to be decoded by the decoding circuit 8, thereby obtaining the reproduced image of the frame 30B. At this time, a position of the bit stream of the frame 30B that is stored in the bit stream storage memory 3 is described in the retrieval table 5. Referring to the retrieval table 5, the reading control circuit 4 outputs the address signal 41 for reading the bit stream of the frame 30B to the bit stream storage memory 3. The bit stream storage memory 3 reads the bit stream of the frame 30B according to the address signal 41, and the read bit stream of the frame 30B is decoded by the decoding circuit 8, thereby obtaining the reproduced image of the frame 30B. The reproduced image of the frame 30B is once recorded in the frame memory 91 to be output as the reproduced output 81 of the decoding apparatus. This state is shown in FIG. 3 by (3).

In backward reproduction, the frame 29B becomes a reproduced image after the frame 30B. Since the frame 29B is B picture, as in the decoding operation of the frame 30B, using the reproduced image of the frame 28P and the frame 31P that is present in the frame memories 92 and 93, as a reference image, the frame 29B is decoded to obtain the reproduced image of the frame 29B. This state is shown in FIG. 3 by (4).

In backward reproduction, the frame 28P becomes a reproduced image after the frame 29B. Since the frame 28P is P picture and is present in the frame memory 92, this is output. In this case, decoding processing of the frame 28P is unnecessary. The frame 27B and the frame 26B as a next reproduced image described later are B pictures, and the reproduced image of the frame 28P and the frame 25P are required as a reference image. However, the reproduced image of the frame 25P is not present in the frame memory. Therefore, decoding of the frame 25P is simultaneously performed.

In order to obtain the reproduced image of the frame 25P, decoding must be performed again from the head of GOP (n+1). The reproduced image of the frame 28P is present in the frame memory 92, and the reproduced image of the frame 31P as P picture after the frame 28P has been already output. Therefore, only the bit streams of the frames 19I, 22P, and 25P may be read from the bit stream storage memory 3. The read bit streams are decoded by the decoding circuit 8 and are recorded in the frame memories. At this time, the reproduced image of the frame 29B and the frame 31P respectively recorded In the frame memories 91 and 93 have been already output and are unnecessary. Accordingly, the reproduced image of the frame 29B and the frame 31P is overwritten to record the reproduced image of the frame 22P and the frame 25P as the latest reproduced image. This state is shown in FIG. 3 by (4) and (5).

In backward reproduction, the frame 27B and the frame 26B become a reproduced image after the frame 28P. Since the frames 27B and 26B are B picture, as in the decoding operation of the frames 30B and 29B, using the reproduced image of the frame 28P and the frame 25P that is present in the frame memories 92 and 93, as a reference image, the reproduced image of the frames 27B and 26B are obtained. This state is shown in FIG. 3 by (6) and (7).

Thereafter, the operation of the main part of the decoding apparatus according to the first embodiment in backward reproduction is performed as described above, until the reproduced output 81 of the reproduced image of the frame 19I is obtained.

In backward reproduction, although the frame 17B and the frame 18B become a reproduced image after the frame 19I, decoding operation of these frames shows a particular case of processing in backward reproduction. The frame 17B and the frame 18B require the frame 16P and the frame 19I as a reference image. However, the frame 16P belongs to GOP(n) and the bit stream of GOP(n) is not present in the bit stream storage memory 3 at this time. Therefore, in order to use the reproduced image of the frame 16P as a reference image, before decoding of the frames 17B and 18B, the bit stream of GOP(n) is read from the optical disk 1 and stored in the bit stream storage memory 3. Then, the bit stream of the frame 16P is read from the bit stream storage memory 3 and decoded by the decoding circuit 8. The obtained reproduced image of the frame 16P is recorded in the frame memory, thereby using the reproduced image as a reference image. This operation is described with reference to FIG. 5.

Figure 5:
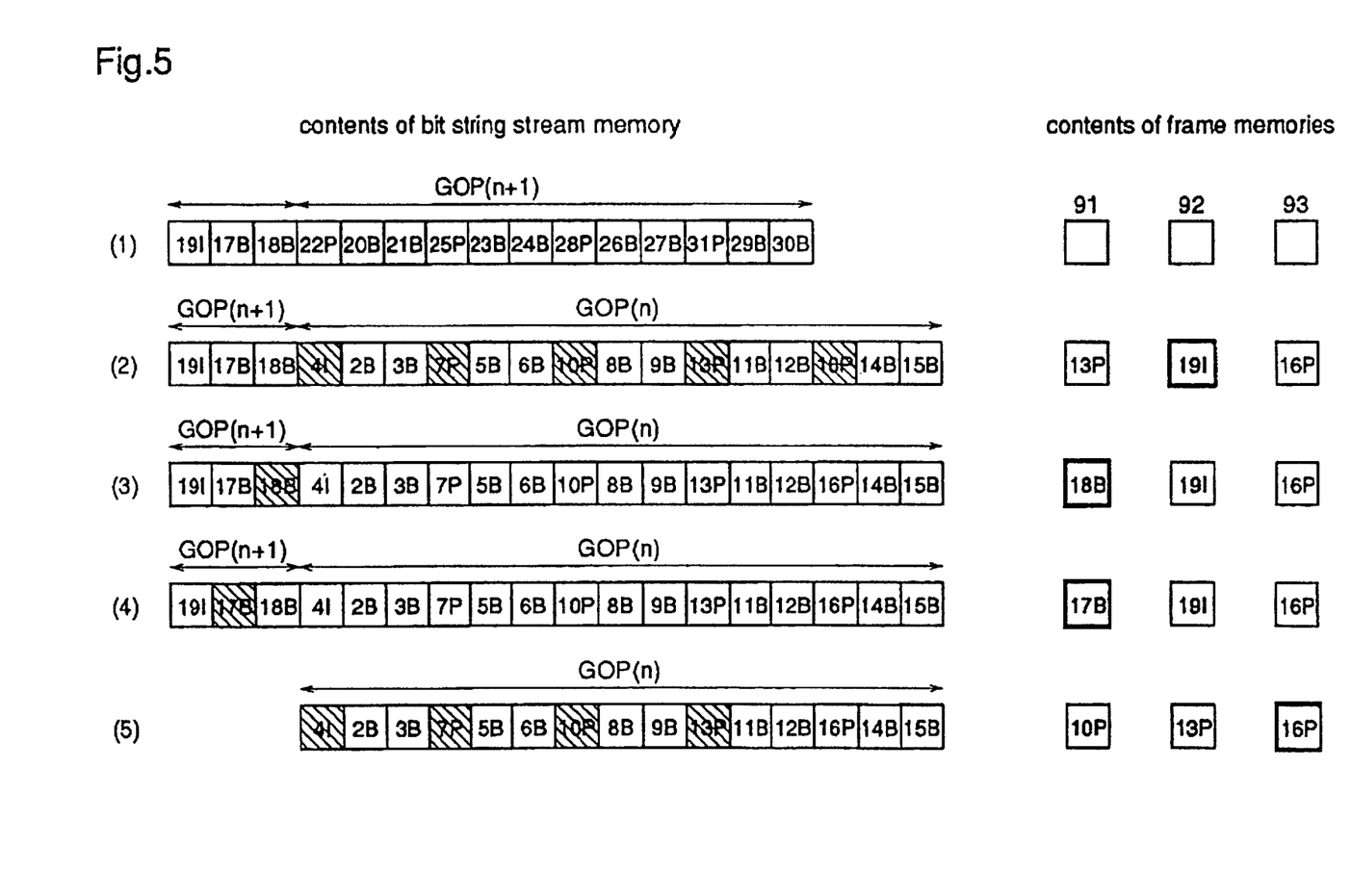
FIG. 5 is a diagram for explaining another contents of a bit stream storage memory and frame memories in the apparatus for decoding video signals according to the first embodiment of the invention.

Initially, the optical disk reading circuit 2 reads the bit stream of GOP(n) from the optical disk 1 to store the same in the bit stream storage memory 3. In this case, the respective frames 20B to 30P of GOP(n+1) that are stored in the bit stream storage memory 3 have been already output and are unnecessary ones. Therefore, the bit stream of GOP(n) can overwrite the frames 20B to 30P. Thereafter, the bit streams of the frame 41, the frame 7P, the frame 10P, the frame 13P, and the frame 16P are read from the bit stream storage memory 3 and decoded by the decoding circuit 8 to obtain a reproduced image. In the frame memories 91 and 93, the frame 13P and the frame 16P as the latest reproduced image are recorded. This state is shown in FIG. 5 by (1) and (2).

Using the reproduced image of the frame 16P and the frame 19P obtained as described above, as a reference image, the frame 189 and the frame 17B are decoded. This state is shown in FIG. 5 by (3) and (4). Since the bit stream of GOP(n+1) is unnecessary after decoding of the frames 18B and 17B is completed, it is possible to erase or overwrite the bit stream of GOP(n+1) as shown in FIG. 5 by (5). The following decoding processing of the respective frames of GOP(n) is the same operation as in the case of GOP(n+1).

As described above, when B pictures as a reproduced image after I picture are decoded in backward reproduction, a reproduced image of I picture included in GOP including the B pictures, and P picture included in previous GOP is required as a reference image. Consequently, the apparatus for decoding video signals according to the first embodiment requires the bit stream storage memory 3 of a capacity that can store a bit stream of one I picture, bit streams of two B pictures as a reproduced image after the I picture, and a bit stream of a GOP unit, as shown in FIG. 5 by (2), (3), and (4).

In the first embodiment of the invention, concerning decoding of I picture and P picture, only I picture and P pictures from the head of GOP to a desired frame are decoded to obtain a reproduced image of the desired frame. At the same time, the latest reproduced image of two of the I picture and the P pictures is recorded in frame memories and the latest reproduced image in the frame memories is used as a reference image. Concerning decoding of B picture, referring to a retrieval table that stores information of addresses of respective B pictures in a bit stream storage memory, a bit stream of a required B picture is read as demanded from the bit stream storage memory and decoded each time to obtain and output a reproduced image. Therefore, unlike the prior art apparatus, a frame memory for storing a reproduced image of one GOP is unnecessary, thereby avoiding an increase in circuit scale and cost up.

In addition, the bit stream of the required B picture is read as demands from the bit stream storage memory and decoded each time to obtain and output the reproduced image. Accordingly, unlike the prior art apparatus, without producing a space of time between outputs of respective frames which belong to the boundary between GOPs, it is possible to obtain a smooth reproduced image.

Further, when B picture of GOP as a reproduced image after I picture is decoded, P picture included in previous GOP is required as a reference image. Therefore, a bit stream of the previous GOP is stored in the bit stream storage memory. Consequently, unlike the prior art apparatus, another frame memory for storing a reproduced image of the previous GOP obtained by decoding the bit stream of the previous GOP is unnecessary, thereby avoiding a trouble of decoding processing and an increase in circuit scale of frame memories. In addition, backward reproduction of consecutive frames can be performed without omitting decoding of the B picture of the GOP as a reproduced image after the I picture.

[Embodiment 2]

Figure 6:
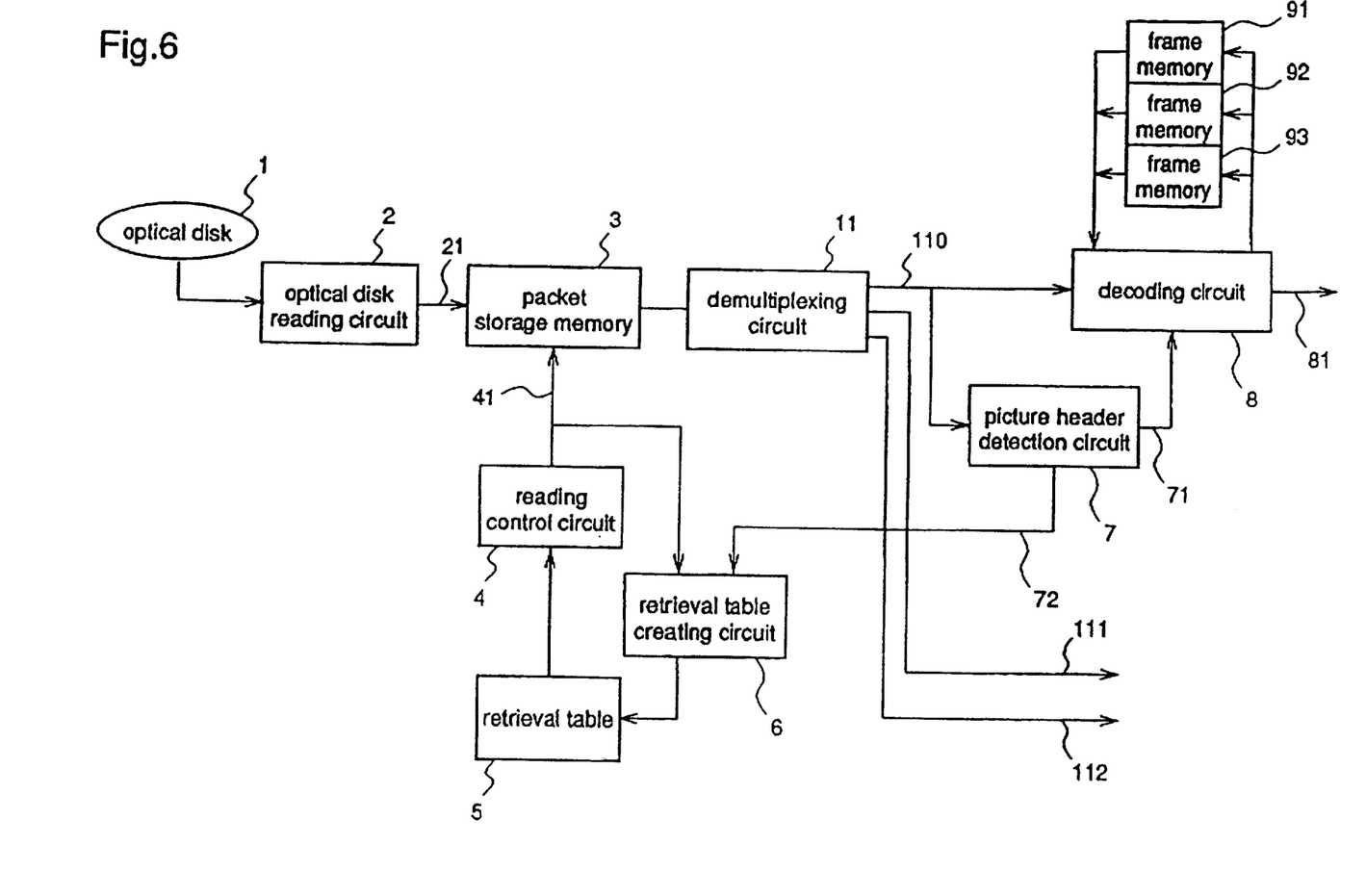
FIG. 6 is a block diagram illustrating an apparatus for decoding video signals according to a second embodiment of the present invention.

A description is given of an apparatus for decoding video signals according to a second embodiment of the present invention. FIG. 6 is a block diagram illustrating the decoding apparatus according to the second embodiment of the invention. In the first embodiment of the invention, the signal output from the optical disk reading circuit 2 includes a bit stream of a video signal. In the second embodiment of the invention, signals output from the optical disk reading circuit 2 is a packet obtained by multiplexing bit streams of a video signal, a sound signal, and other data. For this reason, in FIG. 6, reference numeral 3 designates a packet storage memory for storing a packet comprising multiplexed bit streams that is output from the optical disk reading circuit 2, and outputting the packet to a demultiplexing circuit 11 according to an instruction from the reading control circuit 4. The demultiplexing circuit 11 performs demultiplexing of the input packet to output a bit stream 110 of a video signal, a bit stream 111 of a sound signal, and a bit stream 112 of data. The operations of the picture header detecting circuit 7, the decoding circuit 8, and the frame memories 91 to 93 are the same as in the first embodiment.

In the retrieval table creating circuit 6, storage addresses of packets including bit streams of B pictures in the packet storage memory 3 are ascertained from the address signal 41 which is now being output and the B picture detection signal 72, and information of the addresses is output to the retrieval table 5.

Figure 7:
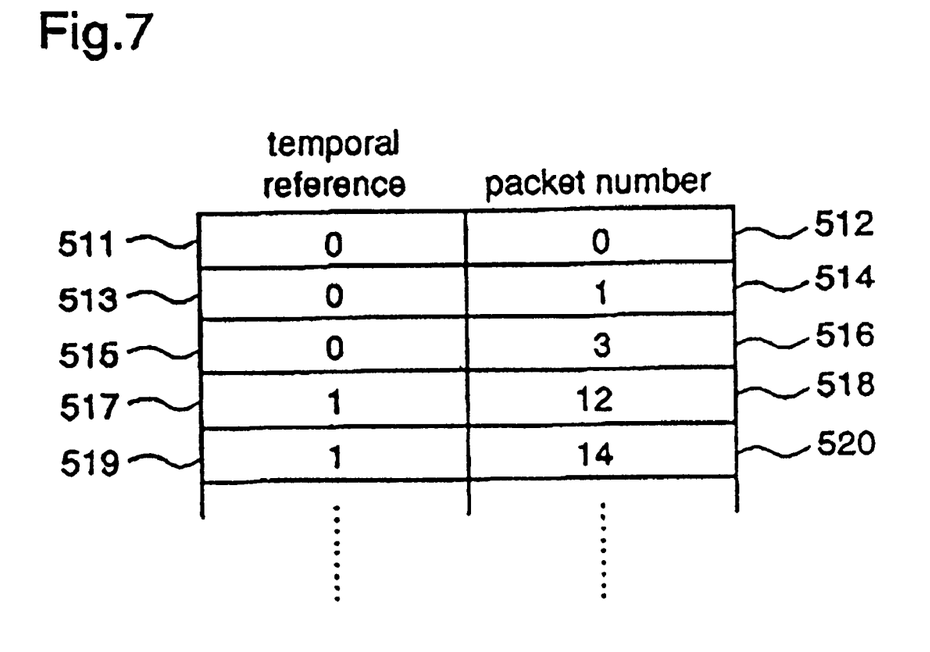
FIG. 7 is a diagram for explaining contents of a retrieval table in the apparatus for decoding video signals according to the second embodiment of the invention.

FIG. 7 shows contents of the retrieval table 5. In the figure, not the packet addresses but the packet numbers are shown in the retrieval table 5. This reason is as follows. Since a packet comprising multiplexed bit streams usually has a fixed length, a desired packet can be read only with information as to where the desired packet ranks among packets that are stored in the packet storage memory 3, leading to higher efficiency than when the packet address is detected.

In addition, temporal references are shown in the retrieval table 5. This reason is as follows. A bit stream of one B picture sometimes extends over a plurality of packets. In this case, bit streams of data, except a video signal, may be inserted in the middle of a row of the plurality of packets, and the packets including information of the same B picture are not always arranged consecutively. Therefore, even in the case of a bit stream of B picture extending over a plurality of packets, if a temporal reference, i.e., the display order in GOP, of the B picture included in the packets is written in the retrieval table 5, the packets including information of the same B picture can be identified, whereby it is possible to read one B picture extending over a plurality of packets.

Further, while in the first embodiment of the invention, the start addresses and the word numbers are shown in the retrieval table, the packet numbers and the temporal references are shown in the retrieval table according to the second embodiment, whereby the size of the retrieval table can be reduced.

As described above, as an apparatus for decoding video signals when bit streams of a video signal, a sound signal, and other data are multiplexed to form a packet, it is extremely suitable to use the decoding apparatus according to the second embodiment.

What is claimed is:

1. A method for decoding video signals comprising decoding a bit stream, and reproducing a video signal in reverse order of frames, the bit stream including each frame of the video signal which has been encoded using one of an intra coding system (I picture), a predictive coding system (P picture), and a bidirectionally predictive coding system (B picture), including:

a group of frames including at least one frame of I picture, which can be decoded from the I picture and consecutively reproduced in order of the frames, being called a GOP (Group of Pictures);

the frames being output in reverse order of the frames to obtain a desired frame, wherein:

when the desired frame is one of I picture and P picture, only the I picture and P pictures from the first I picture in a GOP to the desired frame are decoded; and when the desired frame is B picture, only the desired frame is decoded if reference frames required for decoding of the desired frame are present in frame memories.

2. The decoding method of claim 1 wherein, when the desired frame is present in a frame memory, the desired frame is output.

3. The decoding method of claim 1 including:

providing at least three frame memories; and while outputting a reproduced signal from the first frame memory, decoding a next desired frame that is output using the second and third frame memories.

4. The decoding method of claim 2 including:

providing at least three frame memories; and while outputting a reproduced signal from the first frame memory, decoding a next desired frame that is output using the second and third frame memories.

5. An apparatus for decoding video signals comprising:

a storage medium for recording a bit stream that is obtained by encoding respective frames in a GOP using intra coding of one frame, and predictive coding and bidirectionally predictive coding of a given number of frames, the GOP (Group of Pictures) including a group of frames that can be decoded from halfway through a bit stream obtained by compressing and encoding a video signal;

a storage medium reading means for reading a bit stream of an arbitrary GOP from the storage medium;

a bit stream storage means for temporarily storing the bit stream, and reading and outputting the bit stream by one of consecutively outputting and partially outputting, according to an instruction of a reading control means;

a picture type determining means for evaluating the bit stream output from the bit stream storage means, and determining picture types serving as prediction systems for encoding the respective frames;

a decoding means for decoding only given picture types of the bit stream output from the bit stream storage means, by one of consecutively decoding and decoding according to the results of the picture type determining means;

frame memories for storing at least three reproduced image frames that are output from the decoding means, and using these frames as a reference image and decoded outputs in the decoding means;

a retrieval table creating means for outputting position information of bit streams of the frames by bidirectionally predictive coding that are stored in the bit stream storage means, to a retrieval table, based on the results by the picture type determining means;

a retrieval table created by the retrieval table creating means; and a reading control means for outputting an address for outputting a bit stream of a given frame from the bit stream storage means, referring to the retrieval table.

6. An apparatus for decoding video signals comprising:

a storage medium for recording a bit stream that is obtained by encoding respective frames in a GOP using intra coding of one frame, and predictive coding and bidirectionally predictive coding of a given number of frames, and signals except a video signal, which have been multiplexed as a packet, the GOP (Group of Pictures) including a group of frames that can be decoded from halfway through a bit stream obtained by compressing and encoding a video signal;

a storage medium reading means for reading an arbitrary packet from the storage medium;

a packet storage means for temporarily storing the packet output from the storage medium reading means, and outputting the bit stream by one of consecutively outputting and partially outputting, according to an instruction of a reading control means;

a demultlplexing means for extracting the bit stream of the video signal from outputs of the packet storage means;

a picture type determining means for determining picture types serving as prediction systems for encoding the respective frames, in the bit stream of the video signal;

a decoding means for decoding only given picture types of the bit stream of the video signal, by one of consecutively decoding and decoding according to the results of the picture type determining means;

frame memories for storing at least three reproduced image frames that are output from the decoding means, and using these frames as a reference image and decoded outputs in the decoding means;

a retrieval table creating means for outputting position information of bit streams of the frames by bidirectionally predictive coding that are stored in the packet storage means, to a retrieval table, based on the results by the picture type determining means;

a retrieval table created by the retrieval table creating means; and a reading control means for outputting an address for outputting a packet including a bit stream of a given frame from the packet storage means, referring to the retrieval table.

* * * * *